Jan. 14, 1947.  R. DE VIRGILIS  2,414,223
ILLUMINATED MIRROR
Filed April 13, 1945
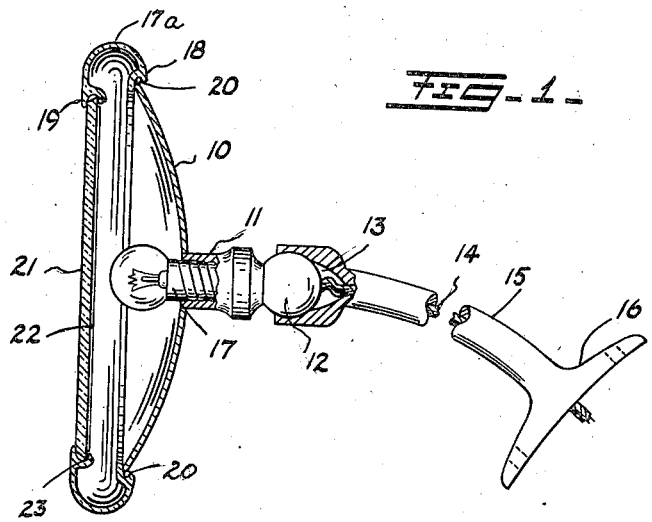
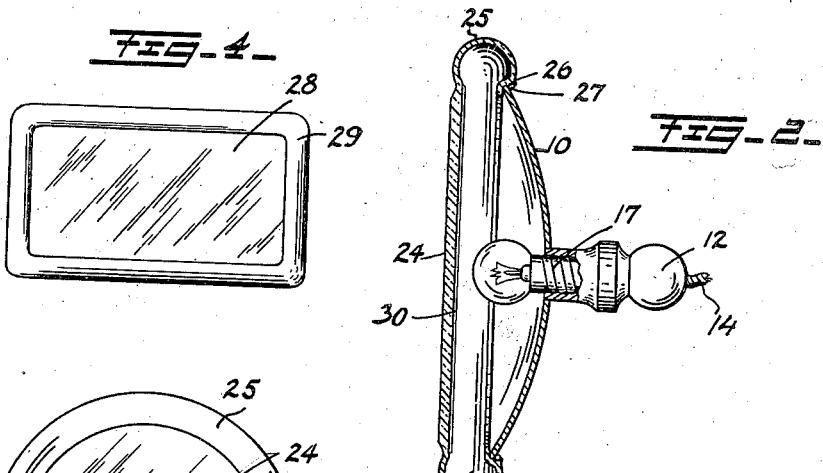
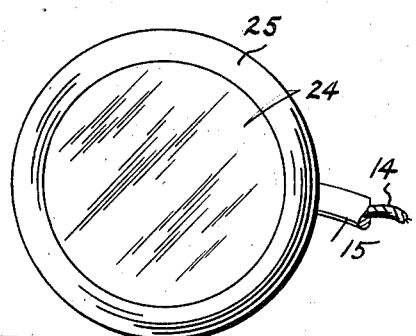
INVENTOR.
RICHARD DE VIRGILIS
BY
Louis Chayka
ATTORNEY.

Patented Jan. 14, 1947

2,414,223

UNITED STATES PATENT OFFICE 2,414,223

ILLUMINATED MIRROR

Richard De Virgilis, Detroit, Mich.

Application April 13, 1945, Serial No. 588,138

2 Claims. (Cl. 240—4.2)

The purpose of my invention is to provide a mirror, such as a back view mirror for automobiles, in which the rim surrounding the surface of the mirror is made luminous by means of a light placed back thereof.

Another purpose of my invention is to provide the mirror with a luminous rim of a type which would be visible at night both from the front, back and that side of the automobile on which the mirror is mounted.

A further and more specified purpose of my invention is to provide a mirror having a luminous rim, in which the area of the mirror and the area of the rim are integral parts of the whole.

I shall now describe my invention with reference to the accompanying drawing, in which:

Fig. 1 is a sectional view of my improved mirror in a plane of its axis, with a sectional view of a part of the supporting means therefor.

Fig. 2 is a sectional view of another variety of my improved mirror in a plane of its axis, with a fragmentary view of supporting means therefor.

Fig. 3 is a plan view of a circular type of my improved mirror.

Fig. 4 is a plan view of a rectangular type of my mirror.

Similar numerals refer to similar parts throughout the several views.

As shown in Fig. 1, the mirror includes a reflector 10 provided at the back, at the central part thereof, with a bushing 11 threaded internally for reception of an electric bulb, generally indicated by numeral 17. The bushing extends to form a ball 12 seated frictionally in a socket 13, for adjustment of the reflector and the mirror portion held thereby to any angular position with respect to its supporting member 15. A cord 14, conveying current to lamp 17, passes through an axial aperture in the supporting member 15 and base 16, which is adapted for mounting on the body of the automobile.

Proceeding to describe the mirror and the rim assembly, I shall start with the rim 17a, made of transparent or translucent material such as glass or plastic. It is substantially semicircular in cross-section and includes marginal portions made in the form of troughs 18 and 19 respectively. The reflector 10 is of such a diameter that it fits exactly into one of said troughs 18 and is retained therein by means of a split ring 20 made of resilient material, the application of such a ring being a common method used for such purposes. At what is the front part of the rim, it holds a flat plate 21, silvered at the back at 22 to form a reflecting surface, said plate being held in place by means of another resilient ring 23, similar to ring 20.

Another species of my illuminated mirror is shown in Fig. 2. Here, the mirror plate 24 and the rim 25 are made of one piece of transparent material, such as glass, the central flat portion of the complete unit being silvered on one side, that is, the inner side at 30, to form a reflecting surface of the mirror. The unit, that is, the mirror and the rim, has a trough-like marginal portion 26 back of the mirror for junction with the reflector 10 and for application of a retaining split ring 27.

A rectangular mirror shown in Fig. 4, includes a flat mirror surface 28 and a luminous ring 29, analogous to that shown in Figs. 1 and 2. In each case, irrespective to the form of the complete mirror, the rim around the reflecting surface forms a frame for such surface of a kind that, being made luminous by a light back of the reflecting surface, is visible both from the front of the automobile, the rear and the side on which the mirror is mounted, this serving as a warning light for motorists and pedestrians.

It is obvious that some changes may be made in the structure of my mirror without departing from the inventive principle disclosed therein.

What I, therefore, wish to claim is as follows:

1. An article of the kind described including a flat mirror, a reflector back of the mirror, a source of light within the reflector, and a translucent rim between the mirror and the reflector, said rim being substantially semi-circular in cross section and forming an outside frame for both the mirror and the reflector, and being adapted to be illuminated by said source of light from within, to be visible from the front, back and the side of said article.

2. An article of the class described including a flat mirror having an integral translucent rim that is semi-circular in cross section, a reflector back of the mirror, a source of light within the reflector, said semi-circular translucent rim forming an outside frame for both the mirror and the reflector, and being adapted to be illuminated by said source of light from within, to be visible from the front, back and side of said article.

RICHARD DE VIRGILIS.